US006816604B2

United States Patent
Young, Jr. et al.

(10) Patent No.: US 6,816,604 B2
(45) Date of Patent: Nov. 9, 2004

(54) DIGITAL FILM PROCESSING FEATURE LOCATION METHOD AND SYSTEM

(75) Inventors: Robert S. Young, Jr., Austin, TX (US);
Richard D. Ball, Austin, TX (US);
Marc C. Digby, Austin, TX (US);
David N. Jones, Austin, TX (US);
Philip E. Cannata, Austin, TX (US)

(73) Assignee: Eastman Kodak Company, Rochester, NY (US)

( * ) Notice: Subject to any disclaimer, the term of this patent is extended or adjusted under 35 U.S.C. 154(b) by 670 days.

(21) Appl. No.: 09/751,471

(22) Filed: Dec. 29, 2000

(65) Prior Publication Data

US 2001/0036296 A1 Nov. 1, 2001

Related U.S. Application Data

(60) Provisional application No. 60/174,073, filed on Dec. 30, 1999, provisional application No. 60/174,074, filed on Dec. 30, 1999, provisional application No. 60/173,781, filed on Dec. 30, 1999, provisional application No. 60/173,787, filed on Dec. 30, 1999, and provisional application No. 60/173,780, filed on Dec. 30, 1999.

(51) Int. Cl.[7] ................................................. G06K 9/00
(52) U.S. Cl. .................. 382/112; 250/559.02; 355/106; 396/575; 382/168; 382/274
(58) Field of Search ............................... 382/112, 113, 382/135, 172, 137, 140, 168, 162, 173, 176, 188, 132, 299, 275, 284, 255, 274, 317; 250/330, 559.02; 355/82, 106; 396/569, 575; 348/96, 97

(56) References Cited

U.S. PATENT DOCUMENTS

| | | | | |
|---|---|---|---|---|
| 3,785,268 A | * | 1/1974 | Gregg et al. | 396/569 |
| 5,266,805 A | * | 11/1993 | Edgar | 250/330 |
| 5,319,719 A | * | 6/1994 | Nakazawa et al. | 382/132 |
| 5,528,288 A | * | 6/1996 | Sandor et al. | 348/97 |
| 5,991,010 A | * | 11/1999 | Nishio | 355/82 |
| 6,091,445 A | * | 7/2000 | Matsui et al. | 348/96 |
| 6,442,301 B1 | * | 8/2002 | Edgar | 382/275 |

* cited by examiner

*Primary Examiner*—Bhavesh M. Mehta
*Assistant Examiner*—Seyed Azarian
(74) *Attorney, Agent, or Firm*—Baker & Botts; David A. Novais

(57) ABSTRACT

One aspect of the invention is a method for locating an unexposed region of film. The method includes the step of illuminating film with a light source while the film has developing chemical applied thereto, the film comprising at least two edges along an x direction perpendicular to a y direction parallel to a surface of the film. The method also includes the step of identifying an unexposed region of the film as a region containing ones of a first plurality of columns of the film, the columns disposed generally in the y direction and captured using at least one sensor operable to capture light reflected from the film, and wherein a representative value for each of the ones of first plurality of columns exceeds a threshold.

42 Claims, 9 Drawing Sheets

DIGITAL FILM PROCESSING FEATURE LOCATION METHOD AND SYSTEM

RELATED APPLICATIONS

This application claims the benefit of U.S. Provision Application Ser. No. 60/174,073 entitled DIGITAL FILM PROCESSING FEATURE LOCATION METHOD AND SYSTEM filed on Dec. 30, 1999.

This application is related to the following co-pending applications filed on Dec. 30, 1999: Ser. No. 60/174,074, entitled METHOD AND SYSTEM FOR ESTIMATING SENSOR DARK CURRENT DRIFT; Ser. No. 60/173,781, entitled PULSED ILLUMINATION SIGNAL MODULATION CONTROL AND ADJUSTMENT; Ser. No. 60/173,787, entitled DIGITAL FILM PROCESSING METHOD AND SYSTEM; Ser. No. 60/173,780, entitled METHOD AND SYSTEM FOR ESTIMATING SENSOR AND ILLUMINATION NON-UNIFORMITIES.

TECHNICAL FIELD OF THE INVENTION

This invention relates generally to image processing and more particularly to a digital film processing feature location method and system.

BACKGROUND OF THE INVENTION

The process of producing images from film typically includes obtaining data from the film and producing image data in a variety of forms. For example, the process may produce photographic prints, slides, and/or digital representations thereof. Usually the process of scanning data from film results in surplus data with no image content, such as data obtained from unexposed regions of the film. This surplus data is outside of the extents (that is, one or more outermost regions of the image data) of the images on the film. Separation of the image data from this surplus data is typically a complex and time-consuming process. Cropping techniques may be employed to improve the appearance of the images by separating the image data from the surplus data obtained from the film. However, these techniques may not provide the flexibility to be used with a variety of digital film processing systems. For example, where the film is developing, characteristics of the film and/or any developing chemical applied thereto vary as the film develops, and may affect the accuracy of these cropping techniques.

In addition, processing images from film typically includes capturing digital data from the film with a sensor as the film is illuminated with a light source. Because the illumination levels captured by the sensor represent the image data, any sensor or illumination non-uniformities introduce undesirable errors into the data measurements. Unfortunately, sensor and illumination characteristics typically vary individually and can drift over time due to factors such as heating and/or transient responses in the devices when they are activated and deactivated. Obtaining digital image data from developing film presents additional challenges. Where the film is scanned while being developed, variances in film and chemical developer characteristics often arise due to changes that take place during the development process. These variations often affect the quality of the resultant image.

SUMMARY OF THE INVENTION

From the foregoing, it may be appreciated that a need has arisen for providing a time invariant feature location method and system. In accordance with the present invention, a system and method are provided that substantially reduce or eliminate disadvantages and problems of conventional systems.

One aspect of the invention is a method for locating an unexposed region of film. The method includes the step of illuminating film with a light source while the film has developing chemical applied thereto, the film comprising at least two edges along an x direction perpendicular to a y direction parallel to a surface of the film. The method also includes the step of identifying an unexposed region of the film as a region containing ones of a first plurality of columns of the film, the columns disposed generally in the y direction and captured using at least one sensor operable to capture light reflected from the film, and wherein a representative value for each of the ones of first plurality of columns exceeds a threshold. In a further embodiment, the method includes the step of determining a plurality of rates of change calculated between a plurality of pairs, each pair comprising at least two adjacent values from the least a portion of a row of values captured from the film, the row of values oriented generally in the x direction perpendicular to the y direction across the film and comprising at least the ones of the first plurality of columns. The method includes the step of comparing the rates of change to an expected signature of an unexposed region and adjusting the location of the unexposed region in response to the comparison.

The invention provides several important advantages. Various embodiments of the invention may have none, some, or all of these advantages. For example, the invention may effectively create, identify and/or locate various features in film while the film is developing. These features may be used as reference data that may be used to adjust image data, thereby improving the quality of resultant images derived therefrom. For example, the invention may locate image extents and unexposed regions of film while the film is developing and thus facilitate the removal of surplus data outside these extents. In some applications, such an advantage may reduce the storage space used to capture data from a roll of film and may further reduce computing resources used to manipulate the captured image data.

Location of one or more unexposed regions of film may provide a window of opportunity to measure data that may be used to correct and/or adjust captured image data. For example, the invention may capture measurements such as white levels that may be used to normalize and/or equalize captured image data, thus improving the accuracy thereof.

The invention may provide the flexibility to be used with a variety of digital film processing systems and a variety of film types. For example, the invention may be used with data that was obtained from film while the film was developing. The invention may also be used with scanners, and/or systems that capture digital data from the film with a sensor as the film is illuminated with a light source. The invention may also be used with systems that capture data for an entire roll of film or a portion thereof, including unexposed regions of the film that typically include no image data. Other technical advantages may be readily ascertainable by those skilled in the art from the following figures, description, and claims.

BRIEF DESCRIPTION OF THE DRAWINGS

For a more complete understanding of the present invention and the advantages thereof, reference is now made to the following descriptions taken in conjunction with the accompanying drawings in which.

DETAILED DESCRIPTION OF THE INVENTION

The preferred embodiment of the present invention and its advantages are best understood by referring to FIGS. 1–6 of the drawings, like numerals being used for like and corresponding parts of the various drawings. A variety of features may be created, detected and/or located during digital film processing. These features may be detected by various methods including, but not limited to, threshold detection, periodic feature detection, adaptive filtering, and the use of histograms. These features may also be used to facilitate processing of image data where the data may be obtained at various film development times. These features may be used as reference features to adjust image data captured during digital film processing. For example, these reference features may be used for image frame detection, image alignment, normalization, equalization and/or noise correction, among other things.

Figure 1:
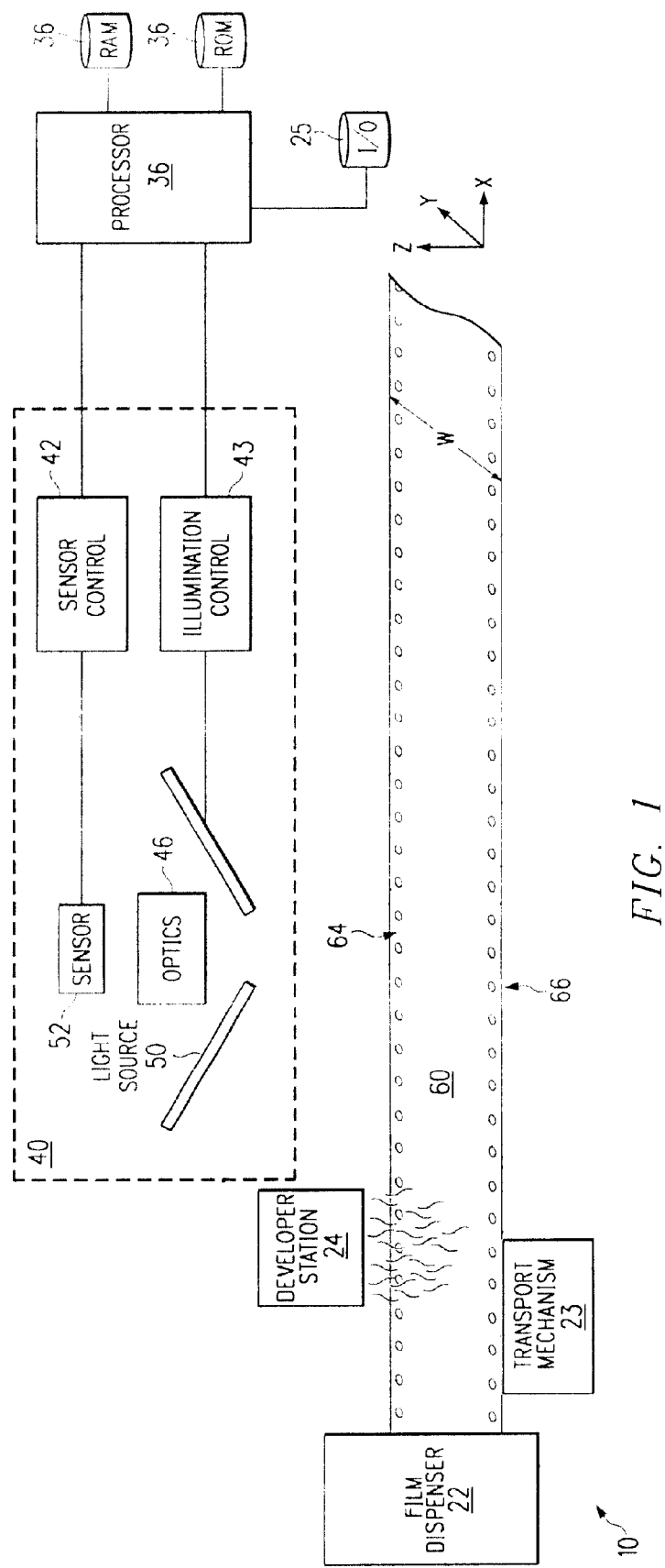
FIG. 1 illustrates an example of a digital film processing system that may be used in accordance with the invention.

FIG. 1 illustrates an example of a digital film processing system 10 that comprises an embodiment of the present invention. Digital film processing system 10 comprises film dispenser 22, at least one transport mechanism 23, a developer station 24, a processor 36 and at least one input/output device 25, and at least one sensor station 40. Digital film processing system 10 is operable to capture and/or adjust data captured from a film 60 that is disposed proximate to and/or may move at a scan rate relative to sensor station 40.

It may be illustrative to utilize a coordinate system to describe digital film processing system 10. For example, sensor station 40 may be disposed in a z direction proximate to, and may be moved at a scan rate relative to, a film 60 operable to store latent image data, such as film. Film 60 may be disposed, for example, in an x-y plane and have a width W in the y direction. By way of example and not by limitation, film 60 may be disposed in a generally vertical orientation, and/or may not be disposed within any single plane, but rather move through a plurality of orientations as sensor station 40 captures image data therefrom. As another example, film 60 may be disposed in a mobius strip configuration so that sensor station 40 may capture image data from both portions 64 and 66. Sensor station 40 may also be disposed proximate to and oriented in various angles relative to film 60.

At least one sensor station 40 is operable to obtain image data from film 60, even while the film may have developing chemicals applied thereto. In other words, the film may be developing, or may be completely developed. Developer station 24 may be used to apply a thin layer of a developing chemical to film 60. By way of example and not by limitation, developer station 24 may be a slot coater or vibrating dispenser that sprays or otherwise applies the developing chemical to film 60. Transport mechanism 23 may be used to move film 60 at a desired scan rate relative to sensor station 40. Film dispenser 22 may be used to retain film 60 and to guide the film onto transport mechanism 23.

Sensor station 40 may be used to capture image data from film 60 and transfers the image data to an input/output device 25 such as a storage medium. Sensor station 40 comprises optical circuitry 46, light source 50, sensor 52, sensor control 42, and illumination control 43. Sensor 52 operates in concert with light source 50 and optical circuitry 46 to capture or obtain image data from the film 60.

Sensor station 40 may have different architectures and scan the film 60 using different colors, or frequency bands (wavelengths), and color combinations. In particular, different colors of light interact differently with the film 60. Visible light interacts with the dye image and silver within the film 60. Whereas, infrared light interacts with the silver, but the dye image is generally transparent to infrared light. The term "color" is used to generally describe specific frequency bands of electromagnetic radiation, including visible and non-visible light.

Visible light, as used herein, means electromagnetic radiation having a wavelength or band generally within the electromagnetic spectrum of near infrared light (>700 nm) to near ultraviolet light (<400 nm). Visible light can be separated into specific bandwidths. For example, the color red is generally associated with light within a frequency band of approximately 600 nm to 700 nm, the color green is generally associated with light within a frequency band of approximately 500 nm to 600 nm, and the color blue is generally associated with light having a wavelength of approximately 400 nm to 500 nm. Near infrared light is generally associated with radiation having a wavelength of approximately 700 nm to 1500 nm. Although specific colors and wavelengths are described herein, the sensor station 40 may utilize other suitable colors and wavelengths (frequency) ranges without departing from the spirit and scope of the invention. Other suitable systems and methods for processing the film 60 in accordance with this invention are taught in copending U.S. patent applications: System and Method for Digital Film Development Using Visible Light, application Ser. No. 60/174,055, Improved System and Method for Digital Film Development Using Visible Light, application Ser. No. 09/751,378, and Defect Channel Nulling, application Ser. No. 08/999,421, each of which are incorporated herein by reference. In addition, U.S. Pat. No. 5,266,805, entitled System and Method for Image Recovery, is also incorporated herein by reference.

Any suitable light source 50 and compatible sensor 52 such as those typically used in image processing applications involving photographic images may be used to capture image data for this aspect of sensor station 40. That is, sensor 52 may be any detector whose quantum efficiency, or responsivity, is compatible with a spectrum utilized by light source 50. In one embodiment, the light source 50 produces light within at least one portion of the visible light spectrum. In this embodiment, the light interacts with the dye image to produce data on the dye image. In another embodiment, the light source 50 produces light within at least one portion of the infrared light spectrum. In this embodiment, the infrared light interacts with the silver within the film 60. This embodiment may be advantageous because infrared light does not substantially fog the film 60. Such an advantage may facilitate location of time invariant features such as unexposed regions of the film. Other combinations of light source and sensors may also be used. Other examples may include, but are not limited to, a light source comprising a single column point source coupled to a scan mirror that may be operated in conjunction with a sensor comprising a point detector coupled to the scan mirror.

In some applications, sensor 52 may comprise a plurality of charge-coupled devices (CCDs), photo diodes, or CMOS sensors. For example, sensor 52 may comprise a digital camera comprising a two-dimensional array of CCDs operable to capture data from a two-dimensional field of view in film 60. Sensor 52 may also comprise a generally linear one-dimensional array, where the array comprises a plurality of detectors such as CCDs. Sensor 52 may also comprise a generally linear array of 4,096 (or any other number) detectors that may be, for example, staggered or linearly aligned within the array. The generally linear array may be operable to capture a data or image column over a generally linear field of view that spans width W (in the y direction) of film 60, or a portion thereof.

Each detector within sensor 52 typically varies in thickness of coating, photoemissive characteristics, optics, etc., and thus typically varies in responsivity to a given amount of illumination. The responsivity of each detector also varies due to noise, age, and temperature. Such variation in responsivity to illumination within each sensor typically results in spatial non-uniformities in the image data. For example, where sensor 52 comprises a generally linear CCD array, variations in the efficiency of each detector in converting photons to electrons results in variations in illumination levels measured by each detector, regardless of variations in the film 60 and/or content therein.

A system signal-to-noise ratio may be measured by a combination of sensor responsivity and illumination characteristics of each sensor station. This signal-to-noise ratio may be improved by selecting sensor 52 for its sensitivity to intensity and wavelength illumination. Further improvements to the accuracy of captured data, and thus to image quality, may also be obtained by matching captured electron levels in sensor 52 to a full dynamic range for each latent image within film 60. For example, the capacity of wells for each detector, that is, the number of photons it may convert to electrons affects the range of discrete digital levels measurable by each detector, regardless of data content within film 60. Wells within sensor 52 may be desirably sized to be sufficiently large to accommodate desired image signal-to-noise ratios. In addition, digital film processing system 10 may adjust integration time for sensor 52 and/or adjust the illumination power of light source 50 in order to maximize usage of the capacity of each detector well within sensor 52.

In one embodiment of the invention, light source 50 may be arranged in a wave guide. Each wave guide may comprise a plurality of illuminators, such as light emitting diodes (LEDs). Light is transmitted through the waveguide and focused on the film 60. Light interacting with the film 60 is measured by sensor 52. Any suitable optical circuitry 46 for use with light source 50 and sensor 52 may be used to produce desired optical effects in the image captured by sensor 52. For example, optical circuitry 46 may be used to focus, magnify or enlarge data in film 60 to a desired image resolution for an application, such as 12 nm per pixel.

Optical circuitry 46 and light source 50 may be manually or automatically controlled by, for example, processor 36.

Processor 36 may be used for image data processing and adjustment in accordance with the present invention. Processor 36 may also control the operation of sensor station 40 by using sensor control 42 and/or illumination control 43. Alternatively or in addition, processor 36 may control sensor station 40 by, for example, executing software that may be stored in an input/output device 25 such as a storage medium. Although a single input/output device 25 has been illustrated for simplicity, input/output device 25 may comprise multiple storage media as well as comprising storage media of different types. Moreover, although illustrated as separate units, processor 36 may perform some, none, or all of the logic functions described as being performed within illumination control 43 and/or sensor control 42.

Specifically, processor 36 may be used to execute applications comprising image data processing and adjustment software. Image data processing and adjustment may be performed using special purpose digital circuitry contained either in processor 36, or in a separate device. Such dedicated digital circuitry may include, for example, application-specific integrated circuitry (ASIC), state machines, fuzzy logic, etc. Processor 36 may also comprise a portion of a computer adapted to execute any of the well known MS-DOS, PC-DOS, OS2, UNIX, MAC-OS and Windows operating systems or other operating systems, including nonconventional operating systems. Processor 36 may comprise random access memory (RAM) 36a and read only memory (ROM) 36b, and may be coupled to one or more input/output devices 25. These devices may include, but are not limited to, printers, disk drives, displays and a communications link. Disk drives may include a variety of types of storage media such as, for example, floppy disk drives, hard disk drives, CD ROM drives, or magnetic tape drives.

Input/output device comprising a communication link may be connected to a computer network, a telephone line, an antenna, a gateway, or any other type of communication link. Image data captured from other than digital film processing system 10 may also be adjusted in accordance with the invention. For example, processor 36 may be coupled to an external network that may be used to obtain image data, such as a scanner or camera system Captured image data may then be provided to processor 36 from a computer network over the communication link.

The present invention includes programs that may be stored in RAM 36a, ROM 36b, or input/output device 25 such as one or more disk drives, and may be executed by processor 36. In this embodiment, image data adjustment may be performed by software stored and executed by processor 36 with the results stored in an input/output device 25 comprising any suitable storage medium. Image data may be processed as it is obtained, after all data has been captured, or a combination thereof.

Illumination control 43 may be used to control the amount of optical energy given off by light source 50, both in time and in amplitude. For example, it may be desirable to adjust the output optical energy from light source 50 if sensor 52 is saturating, or if illumination levels are otherwise determined to be too high or too low. Illumination control 43 may also include additional circuitry used to interface the logic with light source 50.

Sensor control 42 may be used for data transfer and/or processing and to control activation and deactivation of sensor 50. For example, sensor control 42 may convert an analog signal to a digital pixel value, or transfer pixel data stored in sensor 52 where sensor 52 has an internal memory. In some applications, sensor 52 may also comprise logic, such as a programmable processor, that may adjust or process pixel data as desired, before the pixel data is transferred into a memory or storage medium. Such a processor may perform the functions of sensor control 42. In addition, sensor control 42 may also include a bias control to improve system dynamic range. For example, sensors may retain residual charge that decreases the amount of usable sensor capacity, for example, in shift registers, a phenomenon known as image lag. Sensor control 42 may desirably increase the system dynamic range by applying a bias to sensor 52 to reduce the effect of this residual scene content on newly captured image data. Sensor control 42 may comprise software, hardware, or a combination thereof.

Sensor control 42 may also be used to control activation and deactivation of sensor 52, independently of or in conjunction with light source 50. For example, sensor 52 may comprise a mechanical or electronic shutter mechanism for controlling a dwell or integration time in which the sensor may convert a number of photons received into electrons. When light source 50 is activated, sensor 52 integrates over an interval of time signals reflected from film 60. By so controlling a combination of illuminated power and sensor integration time, digital film processing system 10 may adjust an amount of illumination measurable by sensor 52 and thus system dynamic range as desired.

Digital film processing system 10 may obtain data from many kinds of images, such as color photographic images (either negative print or transparency), black and white images (either negative print or transparency and including black and white images derived from photographic film with multiple layers), other monochromatic images, x-rays, or any other type of image stored on film 60. Digital film processing system 10 may capture data from any tangible film 60 that may both reflect back and pass through illumination from a light source. One example of film 60 is discussed in conjunction with FIG. 1A.

Figure 1A:
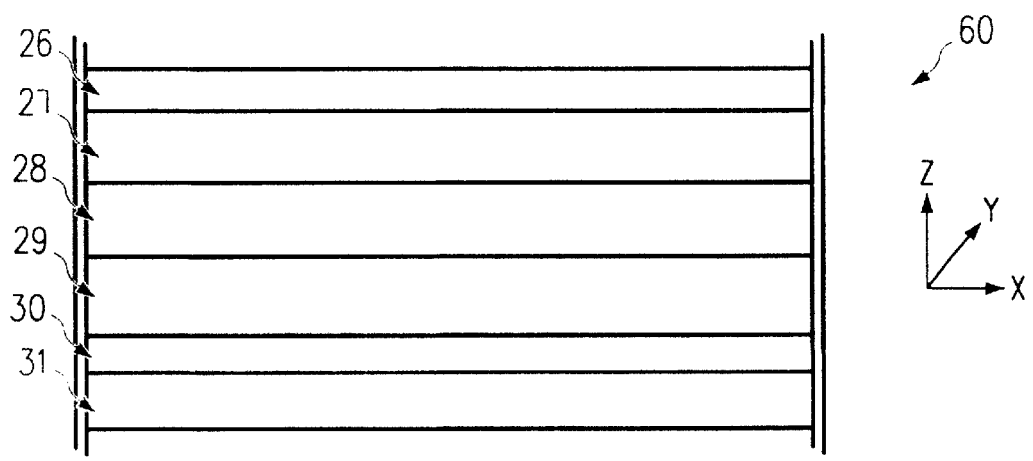
FIG. 1A illustrates a cross section of film from which image data may be captured.

FIG. 1A illustrates an example of a cross-section of film from which image data may be captured. Color film 60 typically comprises three color emulsion layers—e.g., a blue layer 27, a green layer 28 and a red layer 29—that are stacked on an antihalation layer 30. These four layers are typically stacked on a transparent base substrate layer 31. Each of these layers and their density affect the incident angle of light transmitted through the film and thus the illumination levels measured by sensor 52. In some applications, a developing chemical layer 26 may be applied to film 60.

Film types vary with respect to the density of the antihalation layer, layer configuration, and thickness of the base layer. The density of film may also vary with respect to image content therein. For example, photographic film contains grains held on a substrate, such as silver-halide, as part of its physical makeup. These grains are a function of the latent image on the film, as well as the type and format of the film, with faster-speed and smaller-format film exhibiting more graininess.

Developing chemical layer 26 may vary in thickness in the z direction between different points on the film, and may also affect the apparent density of the film. During a film development process, grains within the film that were exposed to the most light are the first to develop, and other grains develop as the development process continues. Those areas in which the most grains develop for a given layer will have the greatest density and lowest resultant pixel values.

In other words, as film 60 develops, it increases in density as silver is formed from compounds within the film 60, thus permitting latent images to be obtained by sensor 42.

Sensor 52 is operable to measure light intensity within a spatial location of an image in film 60, even while film 60 is developing, or still has developing chemical applied thereto. In one embodiment, the light measured by sensor 52 comprises visible light having interacted with the dye images in the film 60. In another embodiment, the light measured by sensor 52 comprises visible light and infrared light having interacted with the dye image and also the silver in the film 60. In yet another embodiment, the light measured by sensor 52 comprises infrared light having interacted with the silver in the film 60.

In an embodiment using only infrared light, the measurements by sensor 52 may be obtained from silver formed from compounds within film 60, rather than from dyes within each of layers 27-29 after the developing chemical has been removed. Each intensity value associated with the intensity of light at that spatial location in the original image in film 60 corresponds to one of a series of pixels within an image as captured and/or stored by image capture engine 34. The intensity refers generally to a pixel's brightness. For example, a white pixel has greater intensity values than a gray or black pixel. Thus, for pixels that comprise eight bits of resolution, a black pixel typically has an intensity value of close to zero, whereas a white pixel has an intensity value of close to 255. The range of light intensities within an image on film may be referred to as a dynamic range of the image. The use of white and dark pixels as used in this specification is not meant to impart any meaning to the content of image data. For example, white and dark pixels within a film negative would have the opposite meanings for a positive image print.

Figure 2A:
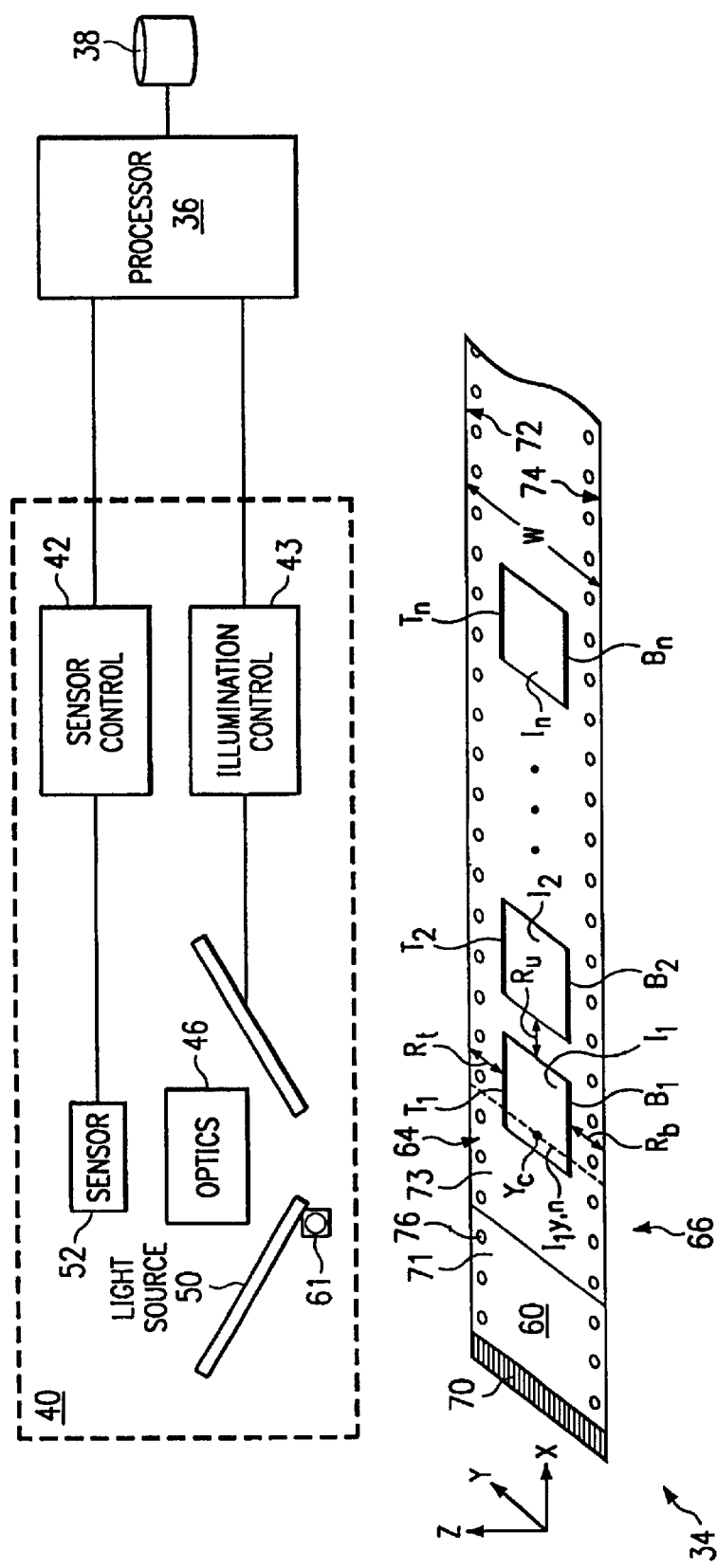
FIG. 2A illustrates an example of an image capture engine that comprises an embodiment of the present invention.

FIG. 2A illustrates an example of image capture engine that comprises an embodiment of the present invention. Image capture engine 34 may be a portion of digital film processing system 10 and comprises processor 36, storage medium 38 and sensor station 40. Image capture engine 34 may also capture data from film 60, including a fixed reference point 70, an exposed region 71, and a leader 73.

Film 60 is illustrated with a width W in the y direction measured between a top edge 72 and a bottom edge 74. Film 60 may comprise a single image frame $I_1$, or a plurality of image frames $I_1$–$I_n$ disposed along the film in the x direction. Each image frame $I_1$–$I_n$ may be the same or a different size. For example, image frame $I_1$ may be an image represented by a×b pixels, where a and b are any integer. That is, image $I_1$ includes a plurality of a pixels or columns in the x direction, and b pixels or rows in the y direction. For example, each image frame $I_1$–$I_n$ may include 1024×1024 pixels, where a=b=1024.

A plurality of image frames $I_1$–$I_n$ is illustrated to discuss one aspect of the invention. In commercial films 60, each of these image frames $I_1$–$I_n$ may be separated by an unexposed region $R_u$. Film 60 may also comprise an unexposed region $R_t$ between a top extent $T_1$–$T_n$ of each image frame $I_1$–$I_n$ and top edge 72, and an unexposed region $R_b$ between a bottom extent $B_1$–$B_n$ of each image frame $I_1$–$I_n$ and bottom edge 74. In some films 60, unexposed regions $R_t$ and/or $R_b$ may also include one or more sprocket holes 76.

Because each image comprises variable content, image capture engine 34 may create opportunities for creating, identifying, and locating time invariant features that may be used to improve the accuracy and/or quality of digital images derived from a variety of film types. Film 60 typically includes a number of time-invariant features, at various locations. For example, although the characteristics of images $I_1$–$I_n$ typically change as film 60 develops, other features such as film scratches, defects, and unexposed regions $R_u$, $R_t$, $R_b$ and sprocket holes 76 do not. In addition to being time-invariant, some of these features may typically be periodic; that is, each feature is repeated at a substantially regular, or periodic, interval throughout film 60. Some or all of these time-invariant feature data may provide additional information that may be used as a reference for a variety of processing and/or adjustment of captured image data that may be performed by image capture engine 34.

For example, image capture engine 34 may utilize one or more of these regions of unexposed film, which comprises a relatively uniform region of the highest light intensities, to determine white levels. In addition, a feature such as exposed region 71 may be created to determine dark levels. This may desirably maximize the mapping of expected intensity values of each location to all usable pixel values. For example, in this embodiment, an area of exposed film 71 and/or unexposed film—the leader 73—precedes a plurality of latent image regions or frames. Each image frame is also typically separated by an unexposed region or gutter $R_u$. Image capture engine 34 may identify the highest and lowest pixel values to be expected at the time of image data capture. White levels as used in this specification may be defined as the highest pixel or signal value expected to be measured by sensor 52.

Exposed region 71 may be automatically or manually created by, for example, exposing an area of film 60 to bright light before a development process begins. Image capture engine 34 may determine dark levels for each detector within sensor 52 by capturing data from exposed region 71. Dark levels as used in this specification may be defined as the lowest pixel or signal value expected to be measured by sensor 52. The use of white and dark levels as used in this specification is not meant to impart any meaning to the content of image data. For example, white and dark levels within a film negative would have the opposite meanings for a positive image print.

To illustrate this aspect of the invention, sensor 52 may comprise a generally linear array operable to capture a data or image column over a generally linear field of view that spans width W (in the y direction) of film 60, or a portion thereof. For example, FIG. 2A illustrates a column $I_{1_{(y,n)}}$ that represents data that may be obtained from film 60 from one column in the y direction through image $I_1$ at column x=n. Column $I_{1_{(y,n)}}$ also may include a pixel $y_c$ approximately centered therein. Data within column $I_{1_{(y,n)}}$ may be used to locate at least a portion of top edge $T_1$, bottom edge $B_1$, and/or top edges $T_2$–$T_n$ and/or bottom edges $B_2$–$B_1$ by using a method similar to the one discussed in conjunction with FIG. 5. Data within column $I_{1_{(y,n)}}$ may also be used to locate features such as unexposed regions $R_u$ and/or sprocket holes 76 using a method such as the one discussed in conjunction with FIG. 6.

In operation, image data is captured from film 60 by, for example, sensor station 40, and is transferred to a storage medium such as storage medium 38. Image capture engine 34 may create, identify and/or locate applicable time invariant feature data as desired, before, during, and/or after image data has been captured from film 60, and in any combination. By utilizing these time invariant features, image capture engine 34 may improve the quality of the resultant digital images by, for example, serving as reference data for image normalization and/or equalization, and noise or defect correction.

Figure 2B:
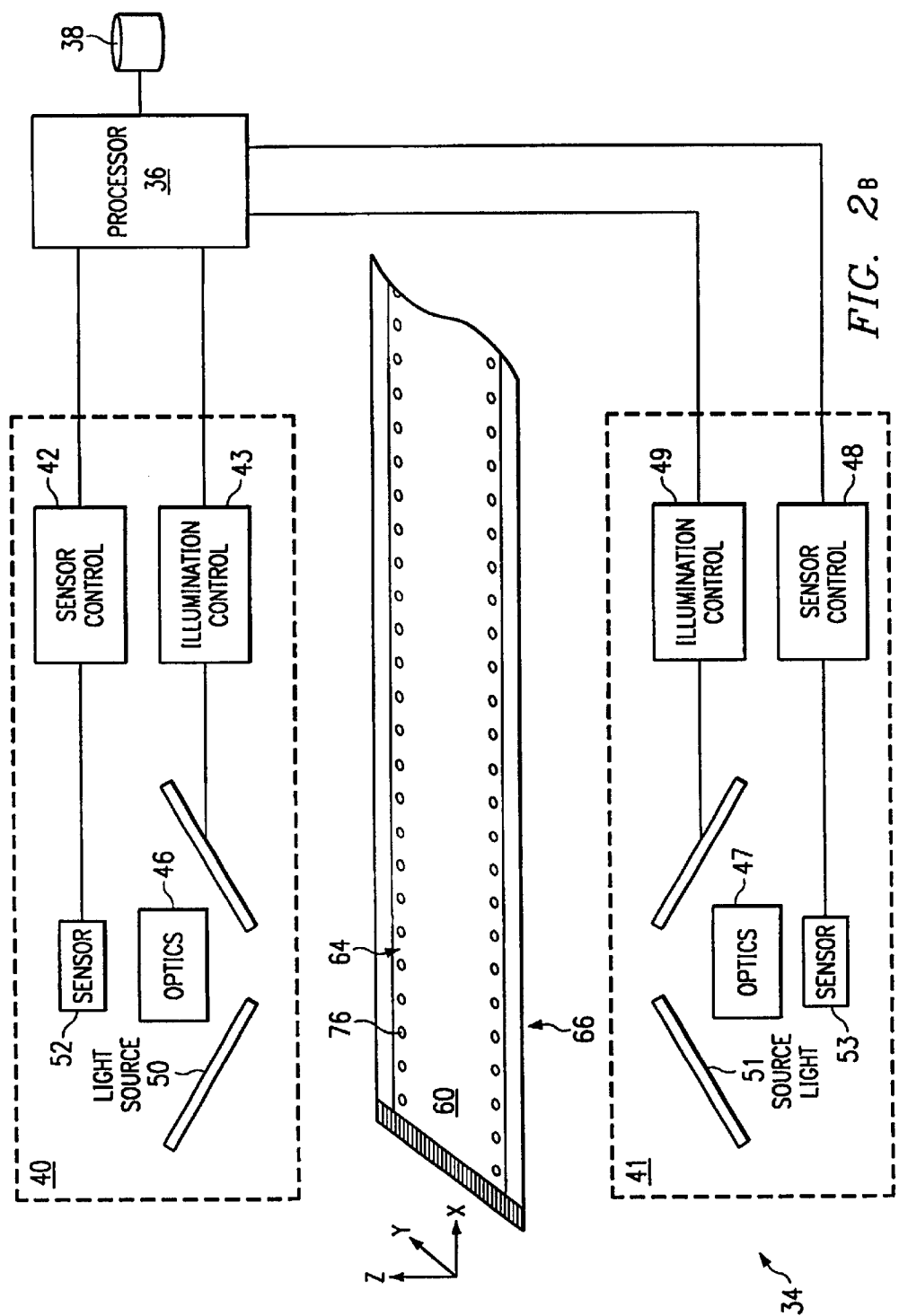
FIG. 2B illustrates another example of an image capture engine that comprises another embodiment of the present invention.

FIG. 2B illustrates another example of an image capture engine that comprises an embodiment of the present invention. Image capture engine 34 may also be a portion of digital film processing system 10 and comprises processor 36, storage medium 38 and sensor stations 40 and 41. Sensor stations 40 and 41 may be used to capture image data from film 60 and may be similarly configured, operated and/or controlled. For example, similar to sensor station 40 as discussed in conjunction with FIG. 1, sensor station 41 may be disposed in a z direction proximate to, the film 60 which generally moves relative to the sensor station 41. Film 60 may also move through a plurality of orientations as both sensor stations 40 and 41 capture image data therefrom. Sensor stations 40 and 41 may also be disposed proximate to and oriented in various angles relative to film 60.

Sensor station 41 comprises optical circuitry 47, light source 51, and sensor 53, and may also comprise its own sensor and illumination control 48 and 49. Alternatively, sensor station 41 may share sensor and illumination controls 42 and 43 with sensor station 40. In this embodiment, sensor station 40 may be located proximate to the top surface 62 of film 60, and sensor station 41 may be located proximate to bottom surface 66 of film 60. Sensors 52 and 53 operate in concert with light sources 50 and 51 and optical circuitry 46 and 47 to capture or obtain image data from film 60. Light sources 50 and 51 may utilize the same or different spectral wavelengths (frequencies).

Sensor station 40 and sensor station 41 may be used to measure illumination levels through various incident angles of light reflected from and/or passed through film 60 to generate a resultant image. For example, sensor 52 may be used to capture light from light source 50 reflected from film 60 and/or light from light source 51 illuminated through film 60. Similarly, sensor 53 may be used to capture light from light source 51 reflected from film 60 and/or light from light source 50 illuminated through film 60. Sensor stations 40 and 41 may be used to obtain four views of an image in film 60. A first view may be obtained by illuminating light source 50 and measuring energy levels within sensor 52 as it captures light reflected from film 60. Approximately simultaneously, sensor 53 may also capture image data as light from light source 50 is directed through film 60. Light source 50 may then be dimmed and light source 51 may be illuminated to obtain third and fourth views captured by light reflected from film 60 by sensor 53, and light illuminated through film 60 by sensor 52. In embodiments where light sources 50 and 51 utilize different spectral wavelengths, four views may also be obtained without dimming either light source, provided that sensors 52 and 53 have two or more columns of detectors which can distinguish between the different spectral wavelengths.

Processor 36 may control the operation of sensor stations 40 and 41 by using sensor controls 42 and 48 and/or illumination control 43 and 49. Alternatively or in addition, processor 36 may control sensor stations 40 and/or 41 by, for example, executing software that may be stored in storage medium 38. Also alternatively or in addition, processor 36 may comprise two individual processors. Each of these processors may control a respective sensor station.

Similar to illumination control 48 as discussed in conjunction with FIG. 2A, illumination control 49 may be used to control the amount of optical energy given off by light source 51, both in time and in amplitude. Sensor controls 42 and 43 may be used to control activation and deactivation of sensors 52 and 53 respectively, independently of or in conjunction with light sources 50 and 51. Sensors 52 and 53 may integrate over different intervals of time, signals reflected from and transmitted through film 60 from light sources 50 and 51. Each sensor 52 and 53 may integrate over a unique interval of time that may vary. Image capture engine 34 may thus control a combination of illuminated power and sensor integration time as desired.

This embodiment may also create, identify, and/or locate a variety of time-invariant feature data as discussed in conjunction with FIG. 2A. For example, differing views may be aligned by using locations of feature data such as sprocket holes 76. Image capture engine 34 may later adjust and combine the image data captured from one or more views by sensor stations 40 and/or 41 into various representations of one or more single images.

Figure 2C:
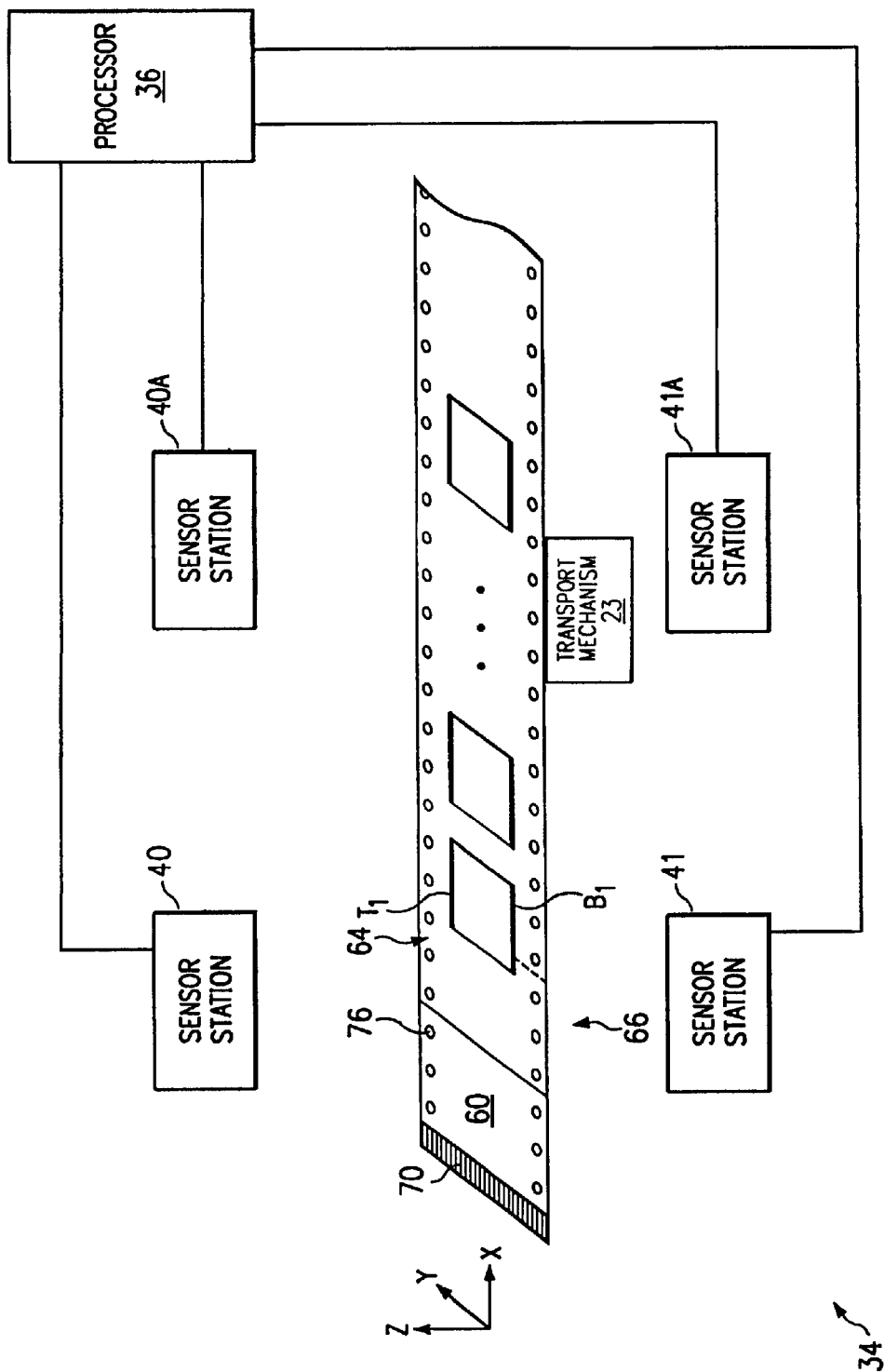
FIG. 2C illustrates another example of an image capture engine that comprises another embodiment of the present invention.

FIG. 2C illustrates another example of an image capture engine that comprises an embodiment of the present invention. In this embodiment, image capture engine 34 may also be a portion of digital film processing system 10 and comprises additional sensor stations 40a and 41a to monitor the reaction of developing film at one of a plurality of development times for the film. In some applications, sensor stations 40a and 41a may be disposed proximate to and at various intervals along the x direction of top portion 64 and bottom portion 66. Film 60 may move relative to these sensor stations at one or more scan rates where, for example, more than one transport mechanism 23 may be used. Each sensor station may be controlled with a common processor 36, or may be controlled with its own processor (not explicitly shown). Any number of additional sensor stations 40a and/or 41a may be used within the scope of the invention.

Image capture engine 34 may later adjust and combine the image data captured from the plurality of sensor stations 40 and/or 41 into various representations of one or more single images. These additional sensor stations may provide additional information with respect to various time-invariant features within film 60 and/or variances in film characteristics as film 60 develops. For example, thresholds may be adapted as film develops and it absorbs more light as the density of silver increases. Furthermore, image capture engine 34 may also utilize none, some, or all of these time-invariant features as a constant reference to align image data captured with these other additional sensor stations. By utilizing a plurality of locations for these feature data produced by these sensor stations, the image data may be adjusted to more accurately reflect the location of image frames. For example, image capture engine 34 may utilize data such as the location of fixed reference point 70 in conjunction with time invariant features such as image extents $T_1$ and $B_1$, and/or sprocket holes 76, as described in conjunction with FIGS. 5 and 6. In addition, because of their periodic nature, image capture engine 34 may utilize some of these features to, for example, predict the location of gutter regions and/or image frames using information derived from the different sensor stations 40, 41, 40a, and 41a by measuring locations with regularly spaced sprocket holes 76.

Figure 3:
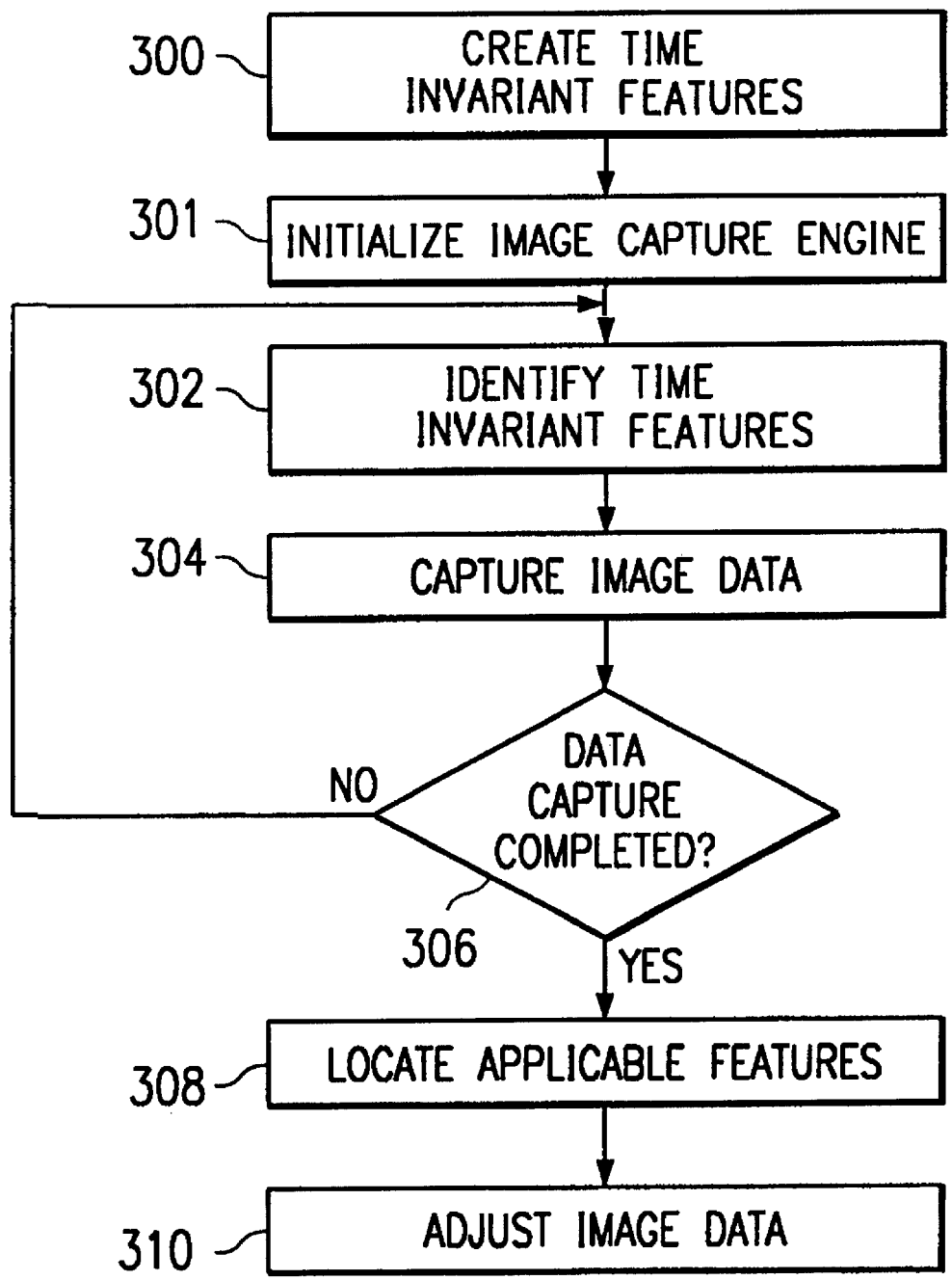
FIG. 3 illustrates an example of a method for capturing and adjusting image data in response to time invariant feature data in accordance with the present invention.

FIG. 3 illustrates an example of a method for capturing and adjusting image data in response to time invariant feature data in accordance with the present invention. While sensor station 40 is used to illustrate this aspect of the invention, the method discussed in conjunction with this FIG. 3 may be used with a plurality of sensor stations. Image capture engine 34 may selectively perform the method using some or all of these sensor stations as desired.

Although steps 300–310 are illustrated as separate steps, various steps may be ordered in other logical or functional configurations, or may comprise single steps. For example, image capture engine 34 may capture image and reference feature data from film 60 and then adjust the image data in response to the feature data after all data has been captured from film 60, or after each pixel, column, or two-dimensional region has been captured, as desired. Alternatively or in addition, image capture engine 34 may create, identify, and/or locate reference feature data from the film and then adjust image data in response to the feature data while it is capturing data from film 60. Identification and/or location of applicable features may be performed during various steps within the method, and by using a variety of methods. Image capture engine 34 may also dynamically vary the frequency for identification and/or location of these features as desired. Steps 300–310 comprise one embodiment of a method for obtaining and adjusting image data by image capture engine 34 that will be used to illustrate one aspect of the invention.

In step 300, one or more time invariant features such as fixed reference point 70 and/or exposed region 71 may optionally be created. For example, exposed region 71 may be created at a selected position on film 60 to measure dark levels to estimate a low level for the dynamic range of film 60. This estimate may be established by obtaining a plurality of readings within the region, such as a column, from exposed region 71, or obtaining substantially all data therefrom. To illustrate, light source 50 may be illuminated, and sensor 52 may capture a plurality of columns of readings of light reflected from exposed region 71. Image capture engine 34 may then average these columns to desirably improve this dark level estimate, because each detector is typically subject to random noise, and film 60 is typically not uniform. This step may be omitted in some embodiments of the invention, or performed at other stages, such as is discussed in conjunction with step 702.

In step 301, image capture engine 34 may initialize sensor 52 and light source 50. For example, image capture engine 34 may optionally allow sensor 52 and/or light source 50 to adjust to equilibrium, and/or adjust and/or set sensor and illumination levels for a film type. To illustrate, image capture engine 34 may adjust and/or set an integration time of sensor 52 and/or an illumination power of light source 50 for an expected density of the film type and expected signal strength. These adjustments may desirably prevent saturation of sensor 52 during capture of image data in image regions within film 60.

In step 302, image capture engine 34 may optionally detect, or identify, applicable time invariant features. For example, image capture engine 34 may use leader 73 to estimate the density of film 60, and to measure white levels to estimate a high level for the dynamic range thereof. Image capture engine 34 may then determine initial estimates for the dynamic range of illumination values to be expected. These estimates may also be established by obtaining a plurality of readings within a region, such as a column, from leader 73, or obtaining substantially all data therefrom, whether or not a chemical developer has been applied, and/or by averaging these readings. Image capture engine 34 may later use these white and dark level estimates to perform equalization and/or normalize gains across selected columns of image data to reduce variations across the image data.

To facilitate location of applicable features, image capture engine 34 may identify expected regions of each data column as or after data is captured. For example, image capture engine 34 may generally break down a portion of a data column into at least two areas—an image region and an unexposed region. These areas generally correspond to an unexposed region $R_1$ and image $I_1$, as discussed in FIGS. 2A–2C. Optionally, a data column may be further broken down into a third area corresponding to unexposed region $R_b$, as illustrated in FIGS. 2A–2C. These areas may be used to locate features in film 60 by a method such as the one discussed in further detail in conjunction with FIG. 5.

In addition, image capture engine 34 may adaptively identify and/or locate various time-invariant features as the film develops. For example, where a plurality of sensor stations is utilized as illustrated in FIG. 2C, image capture engine 34 may utilize adaptive thresholds and/or expected signatures to locate unexposed regions between image frames. This information then may be used to predict the location of an image frame before data within the frame is captured.

In step 304, image capture engine 34 begins capturing data from film 60, by illuminating film 60 using light source 50 and capturing data with sensor 52. As previously discussed, a generally linear array sensor 52 may obtain a data or image column along the y direction of film 60 as illustrated in FIGS. 2A–2C. Film 60 may be moved at a scan rate relative to sensor 52 in the x direction as illustrated in FIGS. 2A–2C to obtain a two-dimensional plurality of columns for each latent image in film 60. Image capture engine 34 may use an imaging window of a length of time sufficient to obtain a desired resolution, such as 12 $\mu$m per square pixel. For example, if a square pixel is desired, optics 46 and a generally linear sensor 52 may be suitably adjusted to obtain data in the y direction of 12 $\mu$m. Then, image capture engine 34 may adjust the scan rate to obtain the desired resolution of 12 $\mu$m in the x direction. At a next imaging window, sensor 52 may capture a next column of data from film 60, and repeat this process until all image data from film 60 has been captured. Alternatively, image capture engine 34 may capture two-dimensional image data from film 60 by using a similar process utilizing a two-dimensional sensor 52, such as a staring array, to obtain image data for a two-dimensional region from film 60.

In step 306, image capture engine 34 optionally determines whether all image data from film 60 has been captured. For example, the invention also contemplates on-the-fly image data adjustment. That is, image capture engine 34 may adjust image data after some or all of the image data has been captured from film 60. In this example, if all image data has been captured, image capture engine 34 proceeds to step 308 to continue the method. If not, image capture engine 34 returns to step 302.

In step 308, image capture engine 34 may optionally detect, or identify, applicable time invariant features after all data has been captured. For example, image capture engine 34 may decimate the data in order to locate features in film 60 by methods such as the ones discussed in further detail in conjunction with FIGS. 5 and 6. Image capture engine 34 may reduce the time necessary to accurately locate features by performing the method in this step.

Image capture engine 34 may perform adjustments in step 310 to image data captured in response to the time invariant features detected and/or located in steps 300–308. The image adjustment described herein may be performed on image data captured by image capture engine 34 or received by processor 36. Although three embodiments of exemplary image capture engines 34 that may be used for image adjustment in connection with the invention have been illustrated, other image capture engines may be used without departing from the scope of the invention.

Processing may be performed as desired, including, but not limited to, a pixel, array (such as a data column), or image frame basis. Processing may also be performed in parallel or pipelined. Adjustment includes, but is not limited to, reduction of errors or other alterations of pixel data in the captured image. To illustrate this aspect of the invention, adjustment is performed on image data captured in data columns by a generally linear sensor that comprises a plurality of detectors. Captured and/or adjusted image data, as well as data captured for estimates and updates, may be stored as pixel values representing the measured sensor illumination levels. These data may be stored in non-volatile memory such as storage medium 38 for subsequent processing, and/or stored in RAM 36a, ROM 36b, or in other storage media within image capture engine 34 for near-simultaneous processing.

Image capture engine 34 may also similarly utilize some, none, or all of these best dark and white levels to determine a best gray scale to use when equalizing the captured image data, and/or to determine maximum and/or minimum thresholds. These thresholds may be used to locate a variety of time invariant features, as is discussed in conjunction with FIGS. 4–6. For example, thresholds may be used where expected signal patterns are used to determine the location of features such as sprocket hole 76. These best dark and white levels may be used to adaptively change these thresholds as film 60 develops.

In addition, statistics may be used in noise or defect correction to eliminate anomalous data that may be due to factors such as nonuniformities of applied developer chemicals, light leakage, flare, scratches, and the like. For example, image capture engine 34 may detect such activity by producing and comparing a histogram within each unexposed region as film 60 develops, by using a plurality of sensor stations. Image capture engine 34 may then accordingly adjust the captured image data to eliminate the anomaly, even within an image frame.

Image capture engine 34 may also utilize a variety of statistics, such as a mean and/or standard deviation, to establish and/or adaptively change an expected signature of a feature. These statistics may include, but are not limited to, the sizes and/or repetition intervals for time invariant feature data such as a the location of sprocket holes 76, and/or unexposed regions $R_u$. These statistics may be gathered within prior values and/or repetition intervals that have previously been determined. These prior values may also have been determined from similar films 60, various views, a prior sensor station at another film development time, and the like.

Figure 4:
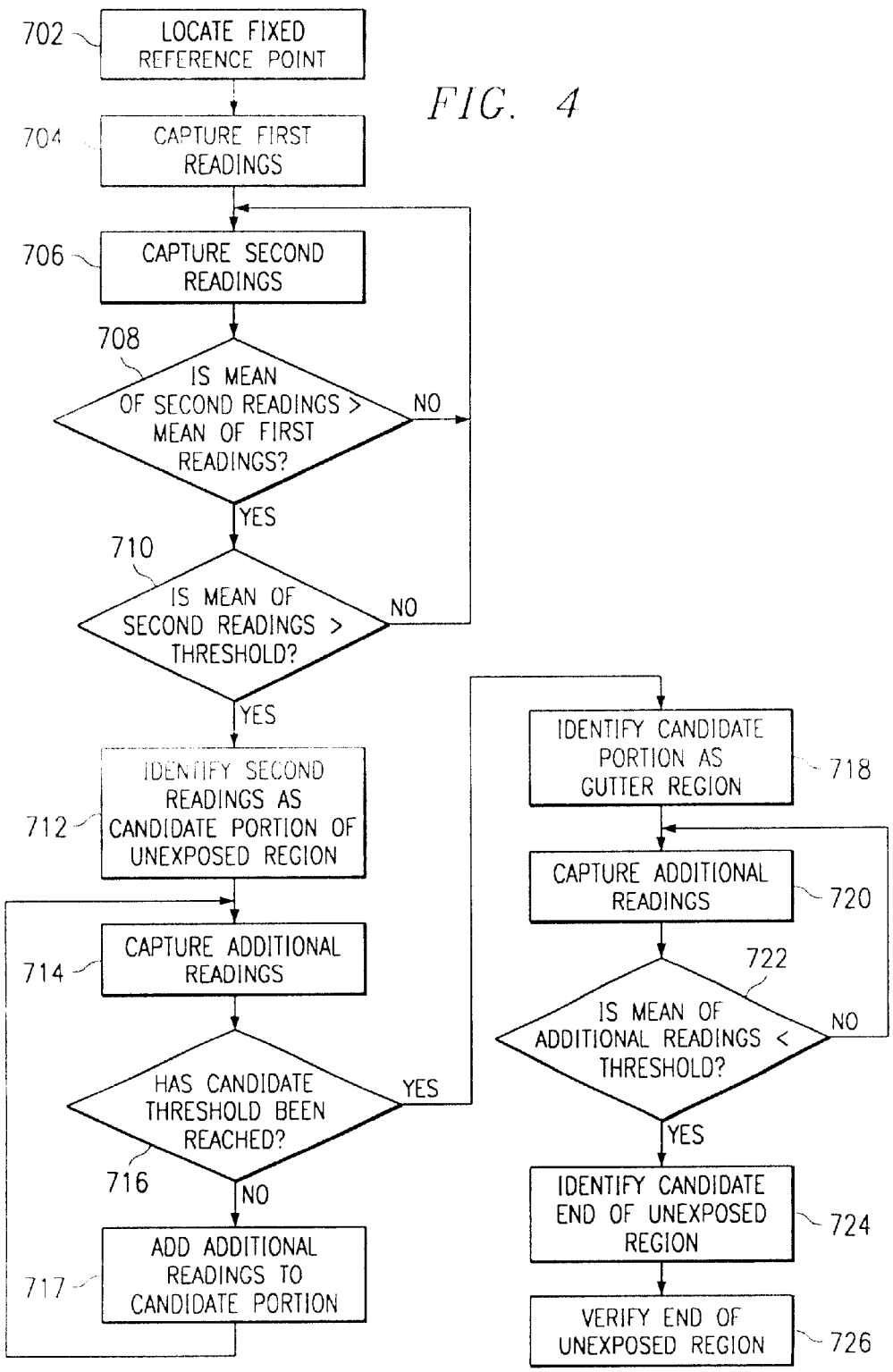
FIG. 4 illustrates an example of a method for locating an unexposed region of film while it is developing in accordance with the present invention.

FIG. 4 illustrates an example of a method for locating an unexposed region of film while the film is developing utilizing the teachings of the present invention. Image capture engine 34 may generally locate none, some, or all unexposed regions of film that usually occur between adjacent images. Image capture engine 34 may utilize several parameters, such as fixed reference point 70, to detect these locations, in some cases, early within the development process. Generally, image capture engine 34 may seek an unexposed region, such as a leader or gutter, $R_u$, of film 60, by capturing a plurality of sensor readings and comparing them to a threshold. When the threshold is exceeded, image capture engine 34 identifies a candidate gutter region. After image capture engine 34 identifies a candidate gutter region, image capture engine 34 then seeks the next latent image frame region, which signals the edge of the gutter region. The method may optionally utilize a variety of parameters and/or counters to establish expected widths of gutters and images, which may be used to detect subsequent gutter locations. These expected widths may also be used to adjust image data that may have been captured early in the development process of film 60. A generally linear array sensor 52, operable to capture a data column from film 60 as film 60 is moved at a scan rate relative to the sensor, is used to describe this aspect of the invention. As discussed previously, the invention also contemplates the use of two-dimensional sensors that move at a scan rate relative to film 60, and staring arrays. The method may be performed for one or more views, and/or one or more sensor stations.

The method begins at step 702, where fixed reference point 70 may optionally be created and positioned at step 702. Fixed reference point 70 may comprise any suitable indicia that may be detected by image capture engine 34, such as tape operable to absorb the wavelength of the light source. Thus, the location of the fixed reference point may be perceived both by a sensor capturing light reflected from, as well as a sensor capturing light illuminated through, film 60. Tape 70 may be, for example, infrared absorbing tape such as Lab Depot Opaque Tape 12–200, and may be disposed, affixed or coupled to either top portion 64 or bottom portion 66 of film 60 as illustrated in FIGS. 2A–2C. Fixed reference point 70 may also comprise a physical edge of film 60. As discussed previously in conjunction with FIGS. 2A–2C and 3, the reference point may also comprise any number of time-invariant reference features that may be detected by various methods, including but not limited to markings such as holes, notches or slits cut into or delineated on film 60. Because the fixed reference point virtually absorbs the wavelength of the light source, readings captured by a sensor from the fixed reference point typically measure zero, or near zero. These near-zero measurements may provide a strongly contrasting signal measurement to any region on film 60, especially near unexposed regions of film 60, where sensor readings typically comprise white levels.

Because unexposed film is very reflective when illuminated with infrared energy, usually the signal values within an image area are significantly below those within a gutter region. Image capture engine 34 may begin capturing a plurality of readings from film 60 shortly after deposition of developer on the film. Values for a plurality of detector readings in a generally linear array may be held in a buffer or storage medium 38 for processing and comparison with subsequent data columns. In step 704, image capture engine 34 begins seeking a first gutter edge. For example, image capture engine 34 may capture a first column of data from film 60, and determine a representative value, such as a mean value, for the first data column. In step 706, image capture engine 34 then captures a next column of data from film 60 and determines a representative value, such as a mean, for the next data column. Image capture engine 34 then in step 708 compares the representative values and determines the greater of the two. Image capture engine 34 then identifies the column with the larger representative value as a candidate gutter portion. Image capture engine 34 may hold the next data column for comparison with successive data columns to be captured from film 60. If the representative value of the first data column is smaller than that of the second data column, image capture engine 34 returns to step 706 to capture a new next data column.

If the representative value of the second data column is greater than that of the first data column, image capture engine 34 then determines in step 710 whether the larger representative value exceeds a threshold. Typically, because signal values within a latent image frame region are significantly below those within a gutter region of film 60, the threshold may be set at a pixel or illumination level value that is reasonably high. For example, the threshold may be predetermined to be a level approximately equal to, for example, 90% of the white level value. The threshold may also be dynamically determined. For example, film becomes more dense as it develops, and image capture engine 34 may decrease the minimum threshold used to identify the latent image edge for a gutter as the illumination levels within image regions measurable by the sensors correspondingly decrease. In this case, image capture engine 34 may desirably adaptively change values for the threshold over time to accommodate variances in the development process.

If the larger representative value exceeds the threshold, image capture engine 34 identifies the next data column as a candidate portion of an unexposed region in step 712. If not, image capture engine 34 returns to step 706 to capture a new next column of data.

Image capture engine 34 then captures an additional column of data in step 714, and repeats the process of determining the greater of the two representative values of last two data columns read and whether the greater representative value exceeds the threshold. This process continues until a candidate threshold has been reached, at which point image capture engine 34 identifies the candidate portion as a gutter region in step 718. That is, enough comparisons have been made to identify a candidate gutter region. If the candidate threshold has not been reached, image capture engine 34 adds the data column with the larger representative value to the candidate gutter portion in step 717 and continues the process in step 714.

The number of comparisons desirable to determine the candidate threshold may vary where film 60 is developing. For example, the number of comparisons may be large where the film has not yet developed to generate sufficient contrast data between images and gutter regions. On the other hand, image capture engine 34 may be able to identify a gutter edge by fewer captured data columns as the film more fully develops in steps 712–716.

Furthermore, image capture engine 34 may optionally also use adaptive methods to count the number of expected columns in each gutter and each image within the film. Image capture engine 34 may adaptively change these values until all image data is captured, and/or from sensor station to sensor station. For example, such as where film 60 has developed sufficiently to provide an expected width for an unexposed region at a given scan rate and pixel resolution, a gutter region may be of a definite value, such as 150 columns of data.

Image capture engine 34 may use a variety of methods to determine a sufficient number of comparisons. For example, image capture engine 34 may also utilize an actual or assumed knowledge of the scan rate and image motion to calculate an expected number of columns in a gutter region as well as an expected number of columns in an image. Image capture engine 34 may also utilize one or more counters. These counters may include, but are not limited to, counters that track the number of data columns that have exceeded the threshold, track the number of data columns that have been captured, and the number of data columns that may be expected in the gutter region, and the number of data columns expected within an image frame.

For example, image capture engine 34 may choose to disable the gutter location feature and avoid performing any adjustments that might have been made to subsequently captured image data, if the expected count values are not properly achieved. Thus, when the number of columns to be expected for a gutter is known, the count of the number of columns exceeding the threshold can be compared. If the threshold is not exceeded before the count reaches the expected number, then the counter should be reset and the search begins anew. Then, image capture engine 34 may verify that the columns comprise a gutter location by counting the number of consecutive columns that exceed the threshold. Similarly, image capture engine 34 may use the counters to verify initial and final boundaries for an unexposed region of film 60, where the unexposed regions are typically regularly spaced and/or regularly sized. For example, commercial films 60 may typically comprise a gutter region 150 columns wide, where pixels generally comprise a resolution of 12 $\mu$.

Because a gutter width is typically wider than one column, once image capture engine 34 has identified a candidate portion as a gutter region, image capture engine 34 next seeks and locates the trailing boundary of the gutter in steps 720–724. This trailing boundary typically abuts the first edge of the next latent image frame. Image capture engine 34 captures an additional data column in step 720, and determines whether a representative value of the data column exceeds the threshold in step 722. If the representative value of the data column does not exceed the threshold, image capture engine 34 determines that the data column is still within the gutter region, and returns to step 720. Image capture engine 34 continues to capture data columns in a similar manner until the representative value of the additional data column fails to exceed the threshold in step 722. Again, image capture engine 34 may optionally utilize a counter to track the number of data columns that have been determined to be within the gutter region, and exit the process as desired, when, for example, expected count values have not been properly achieved.

When the representative value of the data column falls below the threshold, image capture engine 34 then identifies the data column as a first column of a next image in step 724. Image capture engine 34 may also optionally identify additional columns prior to the first column falling below the threshold as a candidate end of the unexposed region in step 724.

Image capture engine 34 may then verify the end of the unexposed region in step 726. For example, image capture engine 34 may compare a counter that has tracked the number of data columns that have been determined to be within the gutter region with a number of expected columns for a gutter. Alternatively or in addition, image capture engine 34 may initiate a counter to track the number of columns in the image, and begin the search for the next gutter edge. When image capture engine 34 identifies a new candidate portion of an unexposed region, image capture engine 34 may compare this counter to the expected width of the image to verify that a proper identification for the image has been made. Image capture engine 34 may also verify that the image is properly located between two actual gutter regions.

The invention contemplates the use of representative values such as arithmetic, geometric, or any other type of mean value, or order statistics, etc. In addition, the mean may be measured over one or more columns of data captured. Furthermore, image capture engine 34 may use a variety of statistical variants, such as standard deviations of the widths and/or the repetition pattern for prior gutter regions, to more effectively identify a next gutter region.

Image capture engine 34 may also utilize parameters such as the scan rate and fixed reference point 70 identified in optional step 702 to more effectively identify the location of one or more gutter regions within film 60. For example, image capture engine 34 may utilize time invariant feature data such as fixed reference point 70 to form a template to predict when to expect and/or verify that a column of data is located within an image and/or a gutter region. Such a template may improve the robustness of the method by, for example, adaptively decreasing the number of columns necessary to identify a candidate gutter region.

Image capture engine 34 may determine a location on film 60 of fixed reference point 70 relative to a location where image data is captured from the film. For example, image capture engine 34 may determine an offset in pixels or in absolute distance from the fixed reference point to another point to determine the location on film 60 of a data column. For example, the fixed reference point may be used in conjunction with time invariant features such as those discussed in FIG. 2A, image extents $T_1$ and $B_1$, and/or sprocket holes 76, as described in conjunction with FIGS. 5 and 6. Because of their periodic nature, image capture engine 34 may utilize these values to predict the location of gutter regions using sensor stations 40a and/or 40b. In some applications, it may be desirable to measure this offset to a sprocket hole 76, because sprocket holes 76 are typically regularly spaced within commercial films 60. As a result, image frames are typically regularly sized with regard to sprocket holes. For example, commercial films 60 typically include image frames that are approximately eight sprocket holes wide. Although where each image frame begins with regard to the sprocket holes may depend on how a camera was loaded, an initial offset, such as three pixels, may be sufficient to determine an exact location of the image frames relative to each sprocket. Then, a relative spacing, in pixels or in absolute distance, may be measured from the nearest sprocket hole to a candidate gutter location.

Alternatively or in addition, the offset may be measured from the fixed reference point to a sensor station. For example, image capture engine 34 may comprise a plurality of sensor stations that capture image data at various film development times as described in FIG. 2C. Moreover, the scan rate for each sensor station may also vary slightly, due to factors such as variance in motor speeds that may move film 60. As a result, the distance measurable in pixels between sprocket holes may vary slightly from sensor station to sensor station. Image capture engine 34 may utilize parameters such as scan rate, resolution, and absolute distances between each sensor station 40a and 40b to appropriately calculate the offset.

In some applications, image capture engine 34 may also use the offset to retroactively identify gutter regions for other sensor stations. For example, image capture engine 34 may monitor development times for sensor stations 40a and/or 40b. Image capture engine 34 may determine at sensor station 40b that development time is sufficient to delineate at least one gutter region and may determine a first gutter location utilizing sensor station 40b. Because the film may be moved relative to sensor station 40b at a different rate than sensor station 40a, image capture engine 34 may utilize the scan rates for sensor station 40b to determine location of the gutter location relative to the fixed reference point.

Image capture engine 34 may then utilize the fixed reference point to determine where the gutter location is relative to sensor station 40a. Image capture engine 34 may utilize this approach to conclusively locate unexposed regions in film early in the chemical development process. Knowledge of these locations may be used to save memory and processing power for the regions of film that comprise useful information content, and to adjust image data that may have previously been captured by sensor stations 40a and/or 40b, as discussed in conjunction with FIG. 3.

Figure 5:
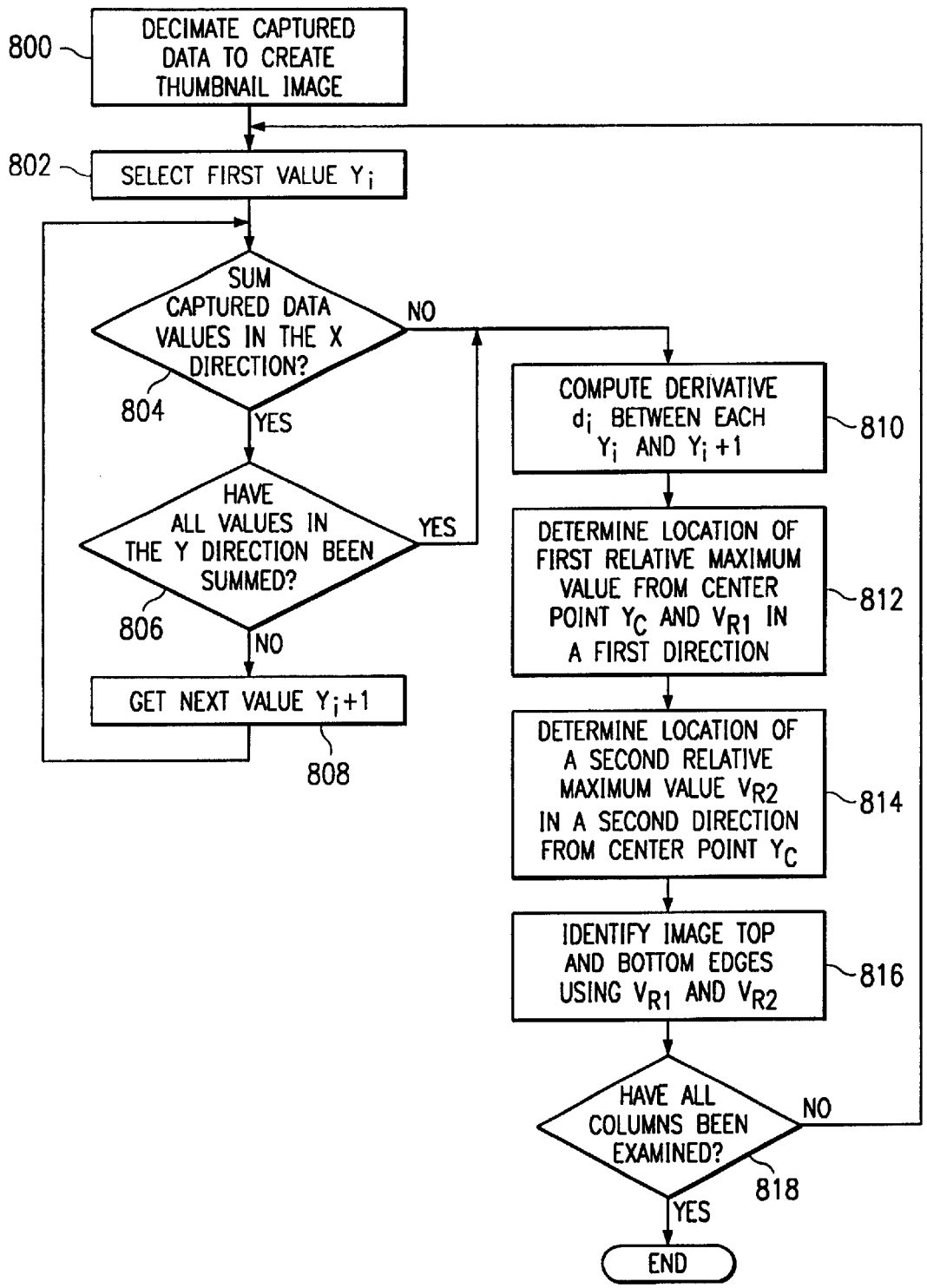
FIG. 5 illustrates an example of a method for locating the top and bottom extents of images in accordance with the present invention.

FIG. 5 illustrates an example of a method for locating the top and bottom extents of images in accordance with the present invention. Although the method is illustrated as separate steps, various steps may be ordered in other logical or functional configurations, or may comprise single steps. Image capture engine 34 may perform the method after all image data has been captured from film 60, whether captured or received by image capture engine 34. Alternatively or in addition, image capture engine 34 may perform these steps while capturing data from film 60.

The method begins at optional step 800, where image capture engine 34 creates a thumbnail image $TN_1$ from the total captured image data by one of a number of known methods. For example, image capture engine 34 may decimate the total captured image data from film 60 by some desirable factor, such as eight. Thumbnail image $TN_1$ then comprises roughly 1/64 of the total captured image data from film 60. This reduction of data through creation of thumbnail image $TN_1$ may be desirable in some applications. For example, it may increase computing efficiency and reduce computing time and/or processing resources for locating image extents. As another example, it may improve the accuracy of image extent location along the x direction of film 60.

In steps 802–808, the method then creates a representative data column $I_{F(y,n)}$ with which to perform the remaining steps of the method. These values are obtained across at least a portion of width W of film 60. These values may be a single data column $I_{1(y,n)}$ as illustrated in FIGS. 2A–2C, a decimated data column $I_{1(y,n)}$, or representative values such as sums derived from a plurality of data columns, whether decimated or not. In step 802, image capture engine 34 selects a first value $y_i$. A first value $y_i$ which represents an ith pixel within a single data column captured across width W in the y direction is used to illustrate this aspect of the invention.

Image capture engine 34 then may optionally sum each of the ith pixel data values in the x direction in step 804 to create a representative data value for $y_i$. In step 806, image capture engine 34 determines whether or not all values in the y direction have been summed. If not, in step 808 image capture engine 34 selects the next value $y_{i+1}$ and then repeats the summing step in 804 for the $y_{i+1}$ pixel data values in the x direction. If all values in the y direction have been summed in step 806, image capture engine 34 proceeds to step 810. Summing each of the ith pixel data values in the x direction in step 804 may also be advantageous in some applications. For example, it may increase extent location computing efficiency and accuracy, and/or reduce computing time and/or processing resources.

In step 810, image capture engine 34 computes a pairwise rate of change, or derivative, $d_i$ between each representative value $y_i$ and $y_{i+1}$ determined in steps 802–808. These pairwise rates of change may be used to identify one or more relative maximum values from which one or more extent locations may be derived. Derivative $d_i$ may be computed by using a number of known methods. In some applications, derivative $d_i$ may be calculated by constructing slopes between selected values $y_i$ and $y_{i+1}$ and dividing the values by a number of piecewise linear segments that can be constructed therebetween. For example, a single piecewise linear slope may result in a derivative $d_i=(y_i+y_{i+1})/2$.

The method may locate a first relative maximum value $V_{r1}$ by searching through these pairwise rates of change from a location within width W such as the center of film 60 out towards top edge 72. The method then may establish the location of a top edge T in response to the first relative maximum value $V_{r1}$. Similarly, the method may locate a second relative maximum value $V_{r2}$ by searching through these pairwise rates of change from the same or a different location within width W out towards bottom edge 74. The method then may establish the location of a bottom edge B in response to the second relative maximum value $V_{r2}$.

In step 812, image capture engine 34 determines the location of a closest relative maximum value $V_{r1}$ between top edge 72 and a selected point, such as center pixel $y_c$. The invention contemplates many methods for determining whether value $V_{r1}$ is a relative maximum with respect to a maximum value $V_M$ within the pairwise rates of change. For example, the term relative may be used by the method to mean a desired fraction of, or predetermined threshold with respect to, a maximum value $V_M$, or an absolute value thereof. For example, value $V_{r1}$ may be a relative maximum if it satisfies the relationship:

$$V_{r1} >= |0.25 \times V_M|$$

A variety of statistical methods may also be used to determine whether value $V_{r1}$ is a relative maximum. For example, image capture engine 34 may calculate a mean and/or standard deviation for maximum values $V_M$ and/or values $V_{r1}$ within prior pairwise rates of change that have previously been determined, and then determine an appropriate threshold. These prior pairwise rates of change may have been determined from similar films 60, various views, a prior sensor station at another film development time, and the like. Image capture engine 34 may determine that $V_{r1}$ is a relative maximum if it meets the appropriate threshold, such as a value that exceeds a mean for prior measurements of $V_{r1}$. In addition, statistics may be used to eliminate anomalous data that may be due to factors such as nonuniformities of applied developer chemicals, light leakage, flare, scratches, and the like.

Value $V_{r1}$ is desirably the closest relative maximum value to the selected point. For example, value $V_{r1}$ may be a first relative maximum found by searching in a positive y direction from the selected point to top edge 72. Alternatively, value $V_{r1}$ may be a last relative maximum found by searching in a negative y direction from top edge 72 to the selected point. In step 814, image capture engine 34 may similarly determine a location of a second closest relative maximum value $V_{r2}$ that is closest to the same or a different selected point and in between that selected point and bottom edge 74.

Image capture engine 34 may use a variety of selected points. For example, the selected point may be the center pixel $y_c$. It also may be desirable for image capture engine 34 to utilize different pixels within the representative data column. As one example, image capture engine 34 may utilize a first selected point approximately one-third width W from top edge 72 of film 60 to locate $V_{r1}$, and a second selected point approximately one-third width W from bottom edge 72 of film 60 to locate $V_{r2}$.

In step 816, image capture engine 34 identifies at least a portion of top edge $T_1$ and bottom edge $T_2$ using values $V_{r1}$ and $V_{r2}$. For example, image capture engine 34 may identify the locations of values $V_{r1}$ and $V_{r2}$ as at least a portion of top edge $T_1$ and bottom edge $T_2$, respectively. On the other hand, it may also be desirable to add to the locations of values $V_{r1}$ and $V_{r2}$ some offset value. This value may more precisely locate at least these portions of top edge $T_1$ and bottom edge $T_2$, where, for example, there are inaccuracies in the data capture process such as misalignment or noise. This value may also reduce inaccuracies caused by slower-than-normal rates of change, which may be due to factors such as light leakage when the image data was originally captured on film.

Image capture engine 34 may also select a variety of different values $y_i$ and $y_{i+1}$ to perform steps 810–816. For example, image capture engine 34 may omit steps 804–808 and perform the method using each of decimated values $y_i$ and $y_{i+1}$ from step 800 for column $I_{F_{(y,n)}}$. Image capture engine 34 may also perform steps 810–816 using original data values $y_i$ and $y_{i+1}$ for column $I_{F_{(y,n)}}$ where, for example, it may be desirable to perform the method as image data is captured. Alternatively or in addition, the method may in some applications utilize fewer computational resources when using decimated image data.

Image capture engine 34 may use objects, tables, or arrays, and/or any suitable method to keep track of data values, maximum and relative maximum values, pairwise rates of change, and the like. These values may also be denoted by tracking the positions of these values in graphical form. Any type of data structure may also be used for the captured image data, image frames, unexposed regions, unexposed regions, and/or top and/or bottom edges.

Figure 6:
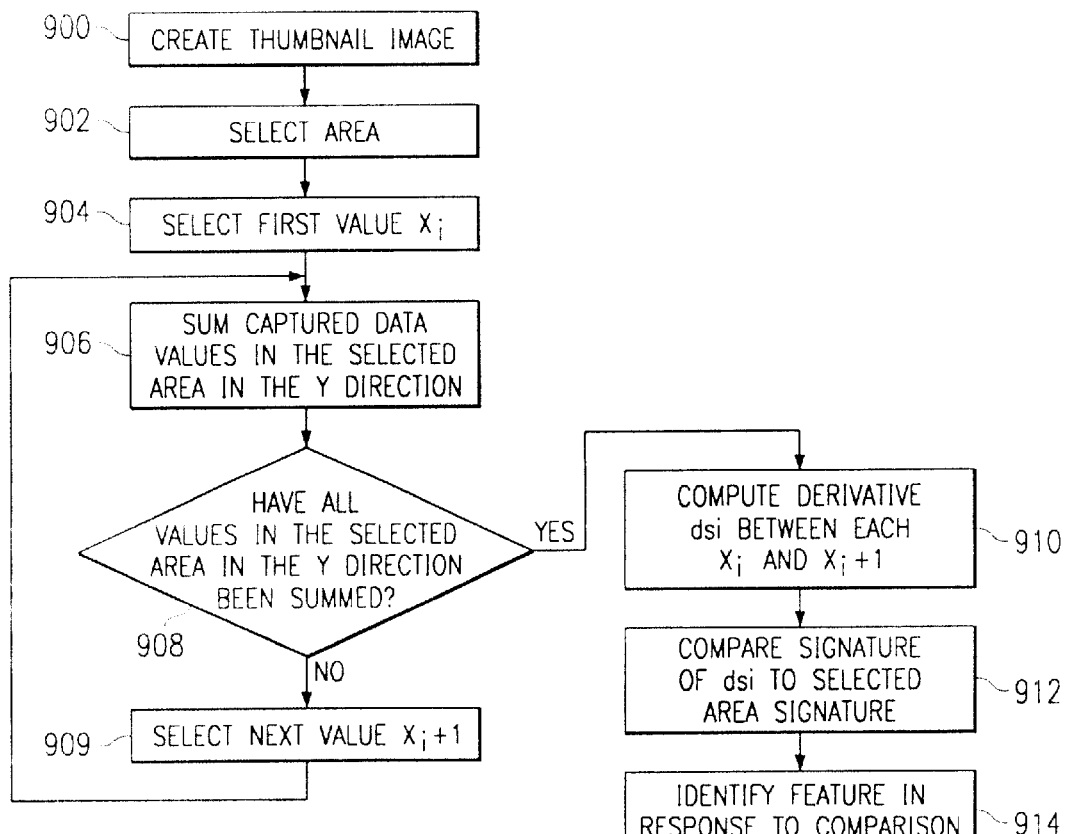
FIG. 6 illustrates an example of a method for locating time invariant features in film using an expected signature in accordance with the present invention.

FIG. 6 illustrates an example of a method for locating time invariant features in film using an expected signature in accordance with the present invention. Although the method is illustrated as separate steps, various steps may be ordered in other logical or functional configurations, or may comprise single steps. Image capture engine 34 may perform the method after all image data has been captured from film 60, whether captured or received by image capture engine 34. Alternatively, or in addition, image capture engine 34 may perform these steps while capturing data from film 60.

The method begins at step 900, where image capture engine 34 creates a thumbnail image $TN_1$ from the total captured image data, as discussed above in conjunction with FIG. 5. Creation of thumbnail image $TN_1$ may desirably increase computing efficiency and reduce computing time and/or processing resources for locating image features.

In step 902, the method then selects an area in which data was captured from film 60. These areas, as previously discussed in conjunction with FIG. 2A, include image areas $I_1$–$I_n$ and an unexposed region such as $R_t$. Data captured within image areas $I_1$–$I_n$ may be used to locate one or more unexposed regions $R_u$, while unexposed regions $R_t$ may be used to locate one or more sprocket holes 76.

In steps 904–908, the method then creates a representative data column $I_{F(x, n)}$ with which to perform the remaining steps of the method. These values are obtained across at least a portion of length L of film 60. These values may be a single row of pixels in the x direction, or representative values derived from a plurality of pixel rows. In step 904, image capture engine 34 selects a first value $x_i$, which represents an ith pixel within a single pixel row captured across length L in the x direction.

Image capture engine 34 then may optionally sum each of the ith pixel data values in the y direction in step 906 to create a representative data value for $x_i$. In step 908, image capture engine 34 determines whether or not all values in the x direction have been summed. If not, in step 909, image capture engine 34 selects the next value $x_{i+1}$ and then repeats the summing step in step 906 for the $x_{i+1}$ pixel data values in the y direction. If all values in the x direction have been summed in step 908, image capture engine 34 proceeds to step 910. Summing each of the ith pixel data values in the y direction in step 906 may also be advantageous in some applications. For example, it may increase accuracy in computing efficiency for location of features such as sprocket holes 76, and/or reduce computing time and/or processing resources.

In step 910, image capture engine 34 computes a pairwise rate of change, or derivative $d_{si}$ between each representative value $x_i$ and $x_{i+1}$ determined in steps 904–908. These pairwise rates of change may be compared with expected signatures from a selected feature, and then used to derive the location of the selected feature. As discussed previously in conjunction with FIG. 5, derivative $d_{si}$ may be computed by using a number of known methods.

In step 912, image capture engine 34 compares $d_{si}$ with a signature for a selected area. This comparison may be made using a number of methods, such as edge detection filters or masks. One such filter or mask may include a Marr-Hildreth edge detector.

While specific values for a signature of a selected feature vary according to a number of parameters, each feature may have a generally recognizable signature. For example, because sprocket holes 76 are typically regularly shaped and/or spaced along the x direction of film 60, the occurrences of sprocket holes 76 may appear generally similar, and at a generally periodic interval. For example, the rates of change measured for data captured across each sprocket hole 76 result in a large negative peak followed by a generally flat region. This generally flat region is subsequently followed by a similarly large positive peak. As data is captured across subsequent sprocket holes 76, this pattern may generally be repeated at the location of each sprocket hole 76. The positive and negative peaks represent data at each edge of sprocket hole 76, while the generally flat region represents an area within sprocket hole 76, where the data is generally not changing. In some applications, this generally flat region may be of a predetermined size, such as for commercial films 60, where sprocket holes 76 are typically of a standard size.

A similar signature may be found for other features such as an unexposed region $R_u$. For example, in commercial films unexposed regions $R_u$ are also typically regularly shaped and/or spaced along the x direction of film 60, and occurrences thereof may appear generally similar, and at a generally periodic interval. For example, the rates of change measured for data captured across each unexposed region $R_u$ result in a large positive peak as data values increase when leaving an image frame, followed by a generally flat region. This generally flat region is subsequently followed by a similarly large negative peak as data values decrease when entering an image frame.

Similar to sprocket holes 76, this pattern may generally be repeated at the location of each unexposed region $R_u$. The generally flat region represents an area within unexposed region $R_u$, bounded by the positive and negative peaks at each edge. In some applications, this generally flat region may be of a predetermined size, such as for commercial films 60, where unexposed region $R_u$ may be generally similarly sized.

A variety of statistical methods may also be used to determine an expected signature for a selected feature. For example, image capture engine 34 may calculate a mean and/or standard deviation for sizes and/or repetition intervals for sprocket holes 76, unexposed regions $R_u$ and/or image frames. These statistics may be gathered within prior values that have previously been determined, and an appropriate threshold may then be determined for each peak and/or flat region, a spacing therebetween, and/or a repetition interval. These prior values may also have been determined from similar films 60, various views, a prior sensor station at another film development time, and the like. In addition, statistics may be used to eliminate anomalous data that may be due to factors such as nonuniformities of applied developer chemicals, light leakage, flare, scratches, and the like.

In step 914, image capture engine 34 determines the location of a selected feature in response to the comparison. The location of the selected feature may be identified in a variety of ways. For example, image capture engine 34 may identify the location as a center of the flat region, and/or use the peak locations to delineate the selected location. Alternatively or in addition, image capture engine 34 may also utilize offsets as discussed above in conjunction with FIGS. 4 and 5 to identify the location of the selected feature. These offsets may be calculated as predetermined values, statistical variations thereof, and/or from various views, sensor stations, and the like.

Image capture engine 34 may also use any type of data structure or method such as objects, tables, or arrays, to keep track of data values, peak and flat region values, repetition patterns, and the like. These values may also be denoted by tracking the positions of these values in graphical form.

While the invention has been particularly shown by the foregoing detailed description, various changes, substitutions, and alterations may be readily ascertainable by those skilled in the art and may be made herein without departing from the spirit and scope of the present invention as defined by the following claims.

What is claimed is:

1. An image extent location method, comprising:
   determining a maximum value of a plurality of rates of change calculated between a plurality of pairs, each pair comprising at least two adjacent values from at least a portion of a column of values captured from a film while the film has developer chemicals applied thereto, the column of values disposed generally in a y direction parallel to a surface of the film and perpendicular to a first film edge and a second film edge both along an x direction of the film;
   determining a closest relative maximum value of the calculated rates of change to a selected pixel in the column of values;
   identifying the location of at least a portion of a first image extent in response to the location of the closest relative maximum value; and
   wherein the steps of determining and identifying are performed using a processor.

2. The image extent location method of claim 1, wherein the location of the at least a portion of the first image extent is the same as a location for a plurality of first image extents along the x direction of the film.

3. The image extent location method of claim 1, wherein the selected pixel is a center pixel of the column.

4. The image extent location method of claim 1, wherein the closest relative maximum value comprises a fraction of the maximum value.

5. The image extent location method of claim 1, wherein determining a closest relative maximum value comprises:
   determining a first relative maximum value of the plurality of rates of change calculated between the plurality of pairs in the y direction from the selected pixel to the first film edge.

6. The image extent location method of claim 4, further comprising:
   determining a closest second relative maximum value of the plurality of rates of change calculated between the plurality of pairs in the y direction from the selected pixel to the second film edge; and
   identify the location of at least a portion of a second image extent in the film in response to the location of the closest second relative maximum value.

7. The method of claim 1, wherein the values were captured from the film using at least one of the group consisting of the near-infrared spectrum, the visible spectrum, the visible spectrum, and the infrared spectrum.

8. The method of claim 1, wherein the values were captured from the film using at least one sensor operable to capture light passed through the film.

9. The method of claim 1, wherein each y value within the column of values comprises a sum of all data captured along the x direction of the film for that y value.

10. The method of claim 9, wherein the sum is divided by a desired factor.

11. The method of claim 1, further comprising adding an offset to the location of the closest relative maximum value to identify the location of the at least a portion of the first image extent.

12. An image extent locator, comprising:
   a computer readable medium; and
   image extent location software residing on the computer readable medium, the image extent location software operable to:
   determine a maximum value of a plurality of rates of change calculated between a plurality of pairs each pair comprising at least two adjacent values from at least a portion of a column of values captured from film while the film has developer chemicals applied thereto, the column of values disposed generally in a y direction parallel to a surface of the film and perpendicular to a first film edge and a second film edge both along an x direction of the film;
   determine a closest relative maximum value of the calculated rates of change to a selected pixel in the column of values; and
   identify the location of at least a portion of a first image extent in the film response to the location of the closest relative maximum value.

13. The locator of claim 12, wherein the location of the at least a portion of the first image extent is the same as a location for a plurality of first image extents along the x direction of the film.

14. The locator of claim 12, wherein the selected pixel is a center pixel of the column.

15. The locator of claim 12, wherein the closest relative maximum value comprises a value within a desired standard deviation of the maximum value.

16. The locator of claim 12, wherein determining a closest relative maximum value comprises:
   determining a first relative maximum value of the plurality of rates of change calculated between the plurality of pairs in the y direction from the selected pixel to the first film edge.

17. The locator of claim 12, wherein the values were captured from the film using at least one of the group consisting of the near-infrared spectrum, the visible spectrum, the visible spectrum, and the infrared spectrum.

18. The locator of claim 12, wherein the values were captured from the film using at least one sensor operable to capture light passed through the film.

19. The method of claim 12, wherein the software is further operable to add an offset to the location of the closest relative maximum value to identify the location of the at least a portion of the first image extent.

20. A digital film processing feature location method, comprising:

determining a plurality of rates of change calculated between a plurality of pairs, each pair comprising at least two adjacent values from the least a portion of a row of values captured from film having developer chemicals applied thereto, the row of values oriented generally in the x direction parallel to a surface of the film and to a first film edge and a second film edge both along the x direction, the x direction perpendicular to a y direction across the film;

comparing the rates of change to an expected signature of a feature;

identifying the location of the feature in response to the comparison; and wherein the steps of determining, comparing, and identifying are performed using a processor.

21. The method of claim 20, further comprising adapting the expected signature as the film develops.

22. The method of claim 20, wherein the feature comprises at least one sprocket hole within the film.

23. The method of claim 20, wherein the feature comprises at least one unexposed region within the film.

24. The method of claim 20, wherein a Marr-Hildreth edge detector is utilized to perform the step of comparing.

25. The method of claim 20, wherein the step of comparing comprises determining whether the rates of change are substantially equal to the expected signature of the feature within a desired standard deviation.

26. The method of claim 20, wherein the values were captured from the film using at least one of the group consisting of the near-infrared spectrum, the visible spectrum, and the infrared spectrum.

27. The method of claim 20, wherein the values were captured from the film using at least one sensor operable to capture light passed through the film.

28. The method of claim 20, further comprising:

generating a first histogram comprising pixel values derived from a first plurality of values captured by a first sensor at a first development time from a region comprising the identified feature;

generating a second histogram comprising pixel values derived from a second plurality of values captured by a second sensor at a second development time from the region comprising the identified feature;

comparing the first and the second histogram; and calculating an adjustment to be applied to the first and second plurality of values in response to the comparison.

29. The method of claim 20, further comprising using the identified location to adjust image data captured from the film.

30. A method for locating an unexposed region of film, comprising:

illuminating film with a light source while the film has developing chemical applied thereto, the film comprising at least two edges along an x direction perpendicular to a y direction parallel to a surface of the film; and identifying an unexposed region of the film as a region containing ones of a first plurality of columns of the film, the columns disposed generally in the y direction and captured using at least one sensor operable to capture light reflected from the film, and wherein a representative value for each of the ones of first plurality of columns exceeds a threshold.

31. The method of claim 30, further comprising identifying an unexposed region of the film wherein:

each of the ones of the first plurality of columns is captured at a successive time interval; and the representative value for each of the ones of the first plurality of columns captured at a particular time interval is less than a representative value of a particular one of the first plurality of columns captured at a time interval following the particular time interval.

32. The method of claim 30, further comprising identifying a boundary of the unexposed region by identifying an expected number of the first plurality of columns of the film as located within the unexposed region.

33. The method of claim 30, further comprising identifying a boundary of the unexposed region by identifying a last portion of the unexposed region of the film as a region containing ones of the first plurality of columns of the film, wherein the representative value for each of the ones of first plurality of columns is less than the threshold, and wherein the step of identifying the last portion is performed after identifying the unexposed region of the film.

34. The method of claim 30, wherein the unexposed region comprises a leader of the film.

35. The method of claim 30, wherein the representative value comprises a mean value.

36. The method of claim 30, wherein the plurality of columns is associated with one of the group consisting of at least one generally linear column of data within the film and a two-dimensional portion of data within the film.

37. The method of claim 30, further comprising adjusting the threshold as the film develops.

38. The method of claim 30, further comprising identifying one of the group consisting of each unexposed region in the film and selected unexposed regions in the film.

39. The method of claim 30, further comprising:

establishing a fixed reference location on the film;

determining an offset from the fixed reference location to the identified unexposed region; and identifying a second unexposed region of the film using the offset, the second unexposed region containing ones of a second plurality of columns of the film, the columns disposed generally in the y direction.

40. The method of claim 39, wherein the fixed reference location on the film comprises one of the group consisting of a reference feature affixed to the film, a defect in the film, a flare within the film, a reference feature viewable with the film, and a scratch in the film.

41. The method of claim 39, wherein the offset comprises one of the group consisting of a distance measured in pixels and a distance to at least one sprocket hole of the film.

42. The method of claim 33, further comprising:

determining a plurality of rates of change calculated between a plurality of pairs, each pair comprising at least two adjacent values from the least a portion of a row of values captured from the film, the row of values oriented generally in the x direction perpendicular to the y direction across the film and comprising at least the ones of the first plurality of columns;

comparing the rates of change to an expected signature of an unexposed region; and adjusting the location of the unexposed region in response to the comparison.

* * * * *